United States Patent [19]

Kang

[11] 3,714,566

[45] Jan. 30, 1973

[54] APPARATUS AND METHODS FOR DERIVING IN ESSENTIALLY REAL TIME CONTINUOUS ELECTRICAL REPRESENTATIONS OF THE FOURIER AND INVERSE FOURIER TRANSFORM

[75] Inventor: George S. Kang, Silver Spring, Md.

[73] Assignee: The Bunker-Ramo Corporation, Oak Brook, Ill.

[22] Filed: Sept. 2, 1970

[21] Appl. No.: 68,861

Related U.S. Application Data

[63] Continuation-in-part of Ser. No. 799,067, Feb. 13, 1969.

[52] U.S. Cl. .................. 324/77 E, 235/156, 235/181, 324/77 G
[51] Int. Cl. ............................................. G01r 23/16
[58] Field of Search ................. 324/77; 235/156, 181

[56] References Cited

UNITED STATES PATENTS 3,209,250   9/1965   Burns et al. ........................... 324/77 G

FOREIGN PATENTS OR APPLICATIONS 1,452,084   9/1966   France ................................ 235/181

OTHER PUBLICATIONS

Cochran et al. What Is the Fast Fourier Transform in IEEE Transactions on Audio and Electroacoustics Vol. AU-15, No. 2 June 1967 pp. 45-55

*Primary Examiner*—Stanley T. Krawczewicz
*Attorney*—Frederick M. Arbuckle

[57] ABSTRACT

Apparatus and methods for deriving in essentially real time unweighted and weighted continuous electrical representations of the Fourier transform and/or the inverse Fourier transform of a complex waveform. In performing the Fourier transform, the input waveform is sampled at the Nyquist sampling rate and the samples stored in respective sample-and-hold circuits. These samples are applied to signal generating circuitry for deriving harmonically related time-varying cosine and sine signals having peak values corresponding to weighted or unweighted values of respective ones of the sample-and-hold circuit outputs, and having a fundamental frequency which may be chosen independently of the frequency content of the input waveform. These cosine and sine signals are then respectively summed for producing resultant summed sine and cosine signals which respectively correspond to weighted or unweighted representations of the real and imaginary components of the Fourier transform of the input waveform with the frequency variable being simulated by time. In one embodiment, these summed sine and cosine signals are applied to a function generator for generating signals representative of the weighted or unweighted amplitude spectrum and/or phase spectrum of the input waveform for further application to appropriately calibrated and adjusted oscilloscopes for producing visual displays thereof. In another embodiment, these resultant summed sine and cosine signals are in turn sampled at the Nyquist sampling rate to provide samples which may conveniently be modified in accordance with desired criteria. The modified samples are then recombined using the inverse Fourier transform technique of the invention which employs circuitry basically similar to that used for the Fourier transform to produce an output signal representative of the original input signal and containing the modifications produced in accordance with the desired criteria.

47 Claims, 7 Drawing Figures

APPARATUS AND METHODS FOR DERIVING IN ESSENTIALLY REAL TIME CONTINUOUS ELECTRICAL REPRESENTATIONS OF THE FOURIER AND INVERSE FOURIER TRANSFORM

CROSS-REFERENCES TO RELATED PATENT APPLICATIONS s

This application is a continuation-in-part of the commonly assigned copending patent application Ser. No. 799,067, filed Feb. 13, 1969.

This application also contains subject matter generally related to that contained in the commonly assigned copending patent application Ser. No. 41,363, filed May 28, 1970, now U.S. Pat. No. 3,614,673.

BACKGROUND OF THE INVENTION

This invention relates to apparatus and methods for electronically performing the Fourier and inverse Fourier transforms, and in particular to improved means and methods for deriving, displaying and/or modifying the amplitude and/or phase spectra of an electrical waveform.

As is well known, it is of very considerable value for many types of applications to be able to conveniently derive and display the Fourier or inverse Fourier transform of an electrical signal as well as desired weighted or modified versions thereof. Such capabilities are important, for example, in the study, analysis, equalization and/or utilization of waveforms associated with communication and detection systems. The input electrical waveform may, for example, be a relatively short pulse, such as the pulse received by a radar system, or may be a relatively long or continuous signal, such as provided by speech, heartbeat, or seismic signals. Presently known apparatus and methods for deriving, displaying and/or modifying such waveforms have the disadvantage of being unduly complex and/or requiring an undesirably long time.

BRIEF DESCRIPTION OF THE INVENTION

The present invention resides primarily in the employment of a highly efficient and advantageous novel combination of digital and analog signal techniques which makes possible the derivation, display, and/or modification in essentially real time of weighted and/or unweighted continuous electrical representations of the Fourier and inverse Fourier transforms of a complex input waveform. In performing the Fourier transform in a typical embodiment, the input waveform is sampled at the Nyquist sampling rate and the samples stored in respective sample-and-hold circuits. These samples are applied to signal generating circuitry for deriving harmonically related time-varying cosine and sine signals having peak values corresponding to weighted or unweighted values of respective ones of the sample-and-hold circuit outputs, and having a fundamental frequency which may be chosen independently of the frequency content of the input waveform. These cosine and sine signals are then respectively summed for producing resultant summed sine and cosine signals which respectively correspond to weighted or unweighted representations of the real and imaginary components of the Fourier transform with the frequency variable being simulated by time. These resultant summed sine and cosine signals may then be applied to a function generator for generating continuous signals in essentially real time which are representative of the weighted or unweighted amplitude spectrum and/or phase spectrum of the input waveform. Such spectrum signals may advantageously and conveniently be displayed by appropriately calibrated and adjusted oscilloscopes, the period of each displayed spectrum being equal to the period of the fundamental frequency used for the derived harmonically related cosine and sine signals.

A basically similar approach to that described above for performing the Fourier transform is also advantageously employed for performing the inverse Fourier transform, except that, in performing the inverse Fourier transform the input waveform is provided in the form of two time-simulated signals corresponding to its real and imaginary components, which signals are separately sampled at the Nyquist rate and the samples stored in respective sets of sample-and-hold circuits. The samples of the real component of the input waveform are used for providing appropriate peak values for the summed harmonically related cosine signals which are generated to form the real component of the inverse Fourier transform, and the samples of the imaginary component of the input waveform are used for providing appropriate peak values for the summed harmonically related sine signals which are generated to form the imaginary component of the inverse Fourier transform. These real and imaginary inverse Fourier transform components may then be combined to provide a single continuous signal in essentially real time which is representative of the inverse Fourier transform of the input waveform.

The specific nature of the invention, as well as other features, objects, advantages, and uses thereof, will become apparent from the following description of typical exemplary embodiments taken in conjunction with the accompanying drawings, in which.

Figure 1:
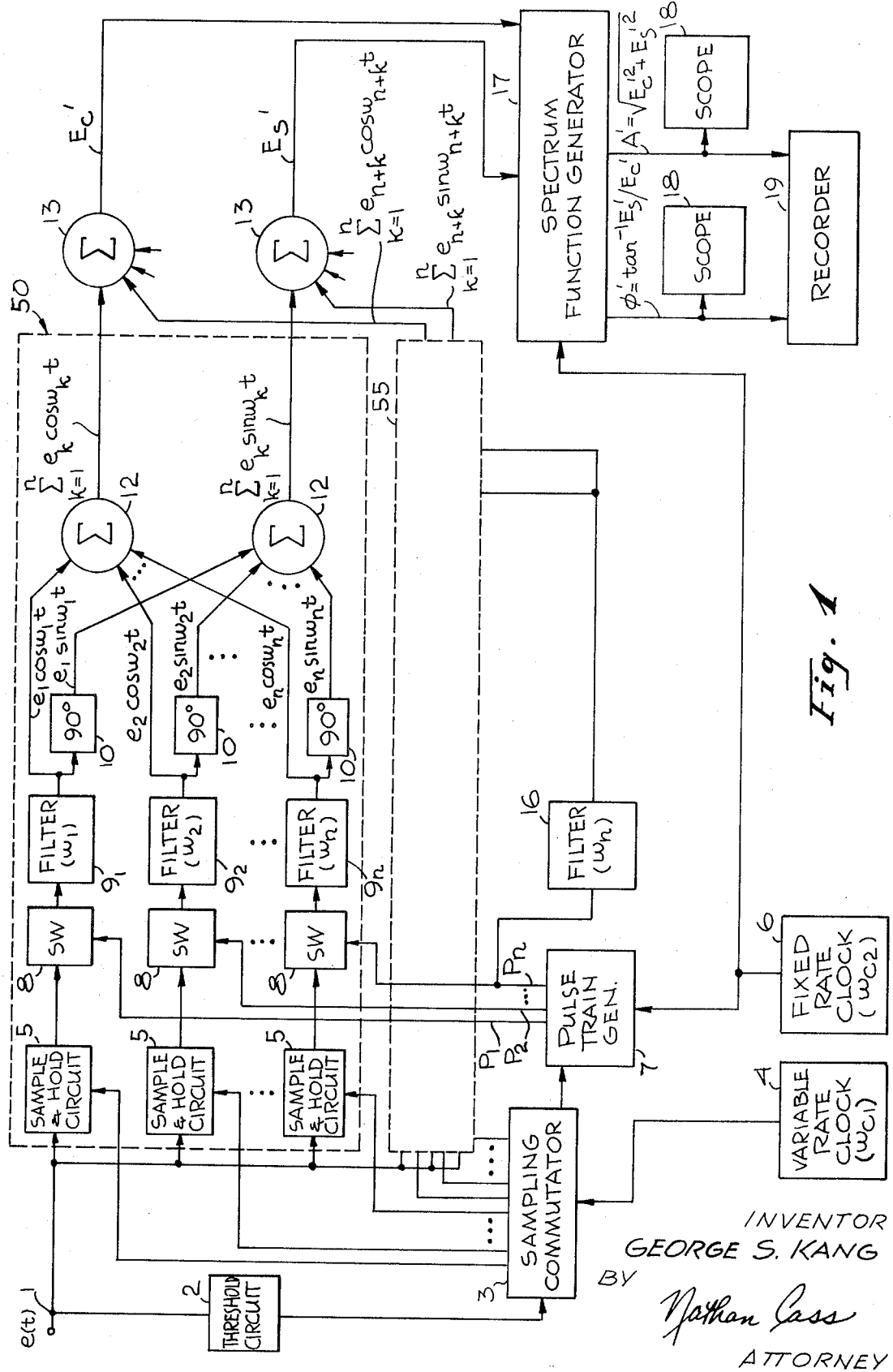
FIG. 1 is an electrical block diagram of an exemplary embodiment of the invention for deriving the Fourier transform of an input waveform for use in displaying the amplitude and phase spectra thereof.

Referring to FIG. 1, illustrated therein is an exemplary embodiment of apparatus for deriving the Fourier transform of an input waveform $e(t)$ for use in displaying the amplitude and phase spectra thereof. The input waveform or signal $e(t)$ is applied to an input terminal 1, and, by way of example, will be assumed to be a received radar pulse. The presence of this input pulse is sensed, for example, by a conventional form of threshold circuit 2 which causes activation of a sampling commutator 3 when the pulse is present.

The sampling commutator 3 may typically comprise a ring counter which operates during the period of the input pulse to sequentially distribute pulses from a variable frequency clock 4 to a plurality of sample-and-hold circuits 5 so as to provide sequential sampling of the input pulse at intervals in accordance with the well known Nyquist sampling theorem. As is well known, the Nyquist theorem provides that a signal may be completely specified by samples taken at intervals no greater than 1/2W, where W is the highest frequency content of the signal.

Each clock pulse from the variable rate clock 4 acts via the sampling commutator 3 to momentarily turn on a respective sample-and-hold circuit 5 to thereby sample the amplitude of a discrete portion of the input pulse. Thus, at the end of the input pulse, the outputs of the sample-and-hold circuits, denoted by $e_l$ to $e_n$, will be the respective sampled amplitude values of the input pulse. It will be understood that the total number of sample-and-hold circuits 5 required is $N = T/t_s$, where T is the duration of the input pulse and $t_s$ is the sampling interval. If $t_s$ is chosen equal to the Nyquist interval 1/2W, as will be assumed for the exemplary embodiment of FIG. 1, then $N = 2WT$.

The sample-and-hold circuits 5 in FIG. 1 may be of conventional form and should be chosen to have a speed of operation compatible with the input pulse and the Nyquist sampling interval. It is to be noted that the exemplary embodiment of FIG. 1 permits the number of samples taken on the input pulse to be readily expanded. The dashed block 50 represents the basic unit providing for n samples, and the dashed block 55 illustrates an add-on unit which may be used to provide for an additional n sample. Further add-on units may also be provided. For present purposes, it will be assumed that only the basic unit 50 is required to meet the Nyquist criterion for the input pulse being analyzed, and that $n = N = T/t_s$. The details of a typical add-on unit will be considered later on herein in connection with FIG. 3.

From the description so far, it will be understood that the application of the input pulse causes samples of the amplitude thereof to be set up in respective ones of the sample-and-hold circuits 5. Since these samples are obtained in conformance with the Nyquist sampling thereon, the outputs of the sample-and-hold circuits 5 are sufficient to completely specify the input waveform and to thereby permit derivation of the Fourier transform and thus the frequency spectrum therefrom.

The well known mathematical expression for the Fourier transform of an input signal $e(t)$ is as follows:

$$E(w) = \int_{-\infty}^{\infty} e(t) EXP[-jwt]dt$$

The above Fourier transform expression may be written in terms of the sampled values as follows (assuming $t_s = 1/2W$):

$$E(w) = \sum_{k=1}^{N} [e_k EXP(-jkt_s w)]t_s \quad (1)$$

where $E(w)$ is the Fourier transform and thus the frequency spectrum of the input signal $e(t)$, w is frequency in radians/second; $j \triangleq \sqrt{-1}$, $e_k$ is the kth sampled value of the input pulse, N is the number of samples, and $t_s$ is as previously defined. While there are various possible ways of implementing Equation (1) above, the approach of the present invention employs a highly advantageous and remarkably simple implementation, as exemplified in FIG. 1, and as will now be described.

For the purposes of the present invention, Equation (1) is expanded and rearranged into its real and imaginary component as follows:

$$E(w) = t_s \left\{ \sum_{k=1}^{N} e_k \cos(kt_s w) - j \sum_{k=1}^{N} e_k \sin(kt_s w) \right\} \quad (2)$$

From Equation (2) the amplitude A and phase $\phi$ of the frequency spectrum $e(w)$ are expressable as:

$$A = \sqrt{E_c^2 + E_s^2} \quad (3)$$

and $$\phi = \tan^{-1}(E_s/E_c) \quad (4)$$

where $$E_c = \sum_{k=1}^{N} e_k \cos(kt_s w) \quad (5)$$

and $$E_s = \sum_{k=1}^{N} e_k \sin(kt_s w). \quad (6)$$

With the above equations in view, attention is again directed to the exemplary embodiment of FIG. 1, where it will now be understood that the outputs $e_1$ to $e_n$ of the sample-and-hold circuits 5 respectively correspond to the $e_k$ terms in the above equations. The next step in accordance with the invention involves the use of these sample-and-hold circuit outputs to derive signals appropriate for use as the terms $E_c$ and $E_s$ of Equations (5) and (6) so as to thereby permit obtaining the desired amplitude and phase spectra using Equations (3) and (4). The manner in which the exemplary embodiment of FIG. 1 provides for the derivation of appropriate signals for this purpose will next be described.

Figure 2:
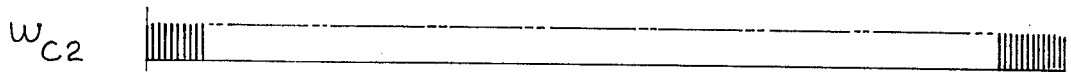
FIG. 2 is a series of graphs illustrating the outputs of the fixed rate clock 6 and pulse train generator 7 in FIG. 1.
Figure 2:
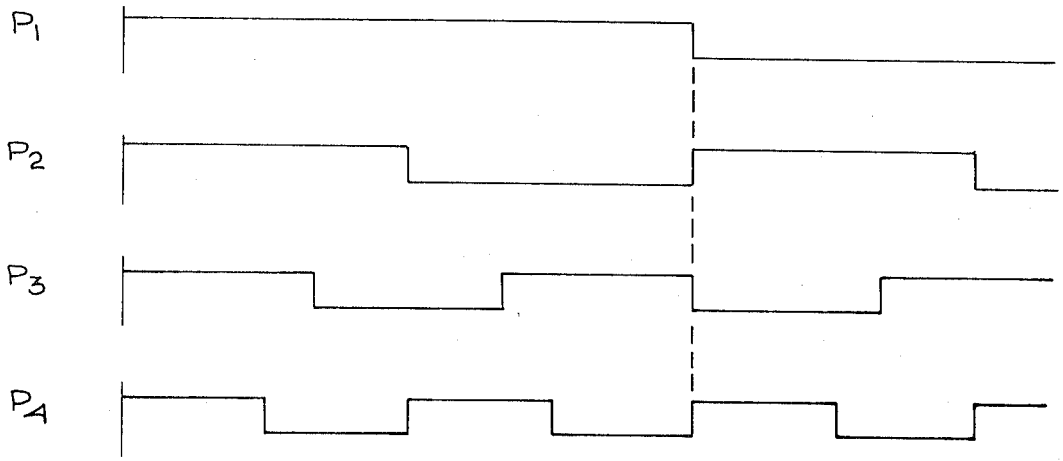

When the input pulse terminates, samples thereof satisfying the Nyquist criterion will have been set up on the sample-and-hold circuits 5 in response to pulses from the sampling commutator 3. The sampling commutator 3 next activates a pulse train generator 7 which operates in response to pulses received from a fixed rate clock 6 for generating n number of harmonically related pulse trains $P_l$ to $P_n$ on like designated output lines, as illustrated in the graphs of FIG. 2. The pulse train generator 7 may be of conventional form and the clock frequency $w_{c2}$ of the clock 6 used therewith should be much greater than the highest frequency pulse train $P_n$.

The outputs $P_l$ to $P_n$ of the pulse train generator 7 are applied to respective switches 8 along with respective outputs $e_l$ to $e_n$ of the sample-and-hold circuits 5 for providing outputs from the switches 8 having the same waveforms and frequencies as illustrated in FIG. 2, but with amplitudes corresponding to the respective sample-and-hold circuit outputs $e_l$ to $e_n$. Conventional bipolar switches may be employed for the switches 8.

The outputs of the switches 8 are applied to respective narrowband filter networks 9 to $9_n$ designed in a conventional manner for providing in-phase sinusoidal outputs $e_l \cos w_l t$ to $e_n \cos w_n t$ having frequencies and amplitudes corresponding to those of the signals applied thereto. The respective quadrature terms $e_l \sin w_l t$ to $e_n \sin w_n t$ are obtained by passing the outputs of the filters 9 to $9_n$ through respective 90° phase shifters 10. It is to be noted that the above-described means for deriving the terms $e_l \cos w_l t$ to $e_n \cos w_n t$ and $e_l \sin w_l t$ to $e_n \sin w_n t$ are relatively simple and do not require the use of complex multipliers as typically found in conventional spectrum analyzers.

Continuing with the description of FIG. 1, the above derived cosine and sine terms $e_l \cos w_l t$ to $e_n \cos w_n t$ and $e_l \sin w_l t$ to $e_n \sin w_n t$ are individually summed by application thereof to respective summing amplifiers 12 for providing the sums $$\sum_{k=1}^{n} e_k \cos w_k t \text{ and } \sum_{k=1}^{n} e_k \sin w_k t.$$

As illustrated in FIG. 1, additional summing amplifiers 13 may also be provided in the event that more add-on units (such as illustrated by the single add-on unit 55) are required to provide sufficient sampling points to satisfy the Nyquist criterion of 2WT samples. In such a case, the additional summing amplifiers 13 serve to respectively sum the summed cosine and sine terms provided by the summing amplifiers 12 of the basic unit 50 with the summed cosine and sine terms of other add-on units. For example, the summed cosine and sine terms of add-on unit 55 may be expressed as:

$$\sum_{k=1}^{n} e_{k+n} \cos_{k+n} t$$

and $$\sum_{k=1}^{n} e_{k+n} \sin w_{k+n} t$$

in which case the total summed outputs from the basic unit 50 and the add-on unit 55 may be expressed as follows:

$$E_c' = \sum_{k=1}^{n} e_k \cos_k t + e_{k+n} \cos w_{k+n} t \quad (7)$$

and $$E_s' = \sum_{k=1}^{n} e_k \sin w_k t + e_{k=n} \sin w_{k+n} t \quad (8)$$

and the total summed outputs from the basic unit 50 and all add-on units may be expressed as $$E_c' = \sum_{k=1}^{n} e_k \cos w_k t + e_{k+n} \cos w_k t + e_{k+2n} \cos w_{k+2n} t + \cdots \quad (9)$$

and $$E_s' = \sum_{k=1}^{n} e_k \sin w_k t + e_{k+n} \sin w_{.+n} t + e_{k+2n} \sin w_{k+2n} t + \cdots \quad (10)$$

Of course, if the n samples provided by the basic unit 50 are sufficient to satisfy the Nyquist criterion (i.e., $n = 2WT$), as is being assumed, then the above equations reduce to:

$$E_c' = \sum_{k=1}^{n} e_k \cos w_k t \quad (11)$$

and $$E_s' = \sum_{k=1}^{n} e_k \sin w_k t \quad (12)$$

It is useful to note at this point in the description that the above derived cosine and sine summation signals $E_c'$ and $E_s'$ differ from the terms $E_c$ and $E_s$ of Equations (5) and (6) in that the signals $E_c'$ and $E_s'$ are time varying rather than frequency varying. Nevertheless, in accordance with the invention, these time-varying signals $E_c'$ and $E_s'$ may advantageously be directly used for the real and imaginary Fourier transform components $E_c$ and $E_s$ in Equations (3) and (4) by using the time variable t to simulate the frequency variable w; furthermore, the present invention provides the very considerable advantage that the fundamental frequency used for the harmonically related cosine and sine signals $E_c'$ and $E_s'$ may be chosen independently of the frequency content of the input signal $e(t)$. The choice of frequencies for $E_c'$ and $E_s'$ need merely be such that the frequencies have a harmonic relationship to some desired fundamental frequency which may be $w_l$ or some lower frequency. In other words, the frequencies of $w_l$ to $w_n$ and the fundamental frequency $w_o$ thereof are chosen to satisfy the following relationships: $w_l = (b + 1)w_o$, $w_2 = (b + 2)w_o \ldots w_n = (b + n)w_l$, where $b$ is any desired integer including zero. Since the operating time required following termination of the input waveform is dependent upon the period of the fundamental frequency used, it will be understood that any desired operating time may be provided by proper choice of the fundamental frequency. The reason why such signals as $E_c'$ and $E_s'$ can be used for the terms $E_c$ and $E_s$ so as to permit the above advantages to be realized will become evident as the description progresses.

Since $E_c'$ and $E_s'$ can be used in place of $E_c$ and $E_s$, as pointed out in the previous paragraph, $E_c'$ and $E_s'$ can be used in the operations required by Equations (3) and (4). The resulting equations for the amplitude and phase outputs $A'$ and $\phi'$ are thus expressable as:

$$A' \times \sqrt{E_c'^2 + E_s'^2} \quad (13)$$

and $$\phi' = \tan^{-1} E'_s/E'_c - (bt_s)t \qquad (14)$$

The additional term $(bt_s)t$ in the equation for $\phi'$ is required in order to take care of the situation when $b \neq 0$.

Figure 4:
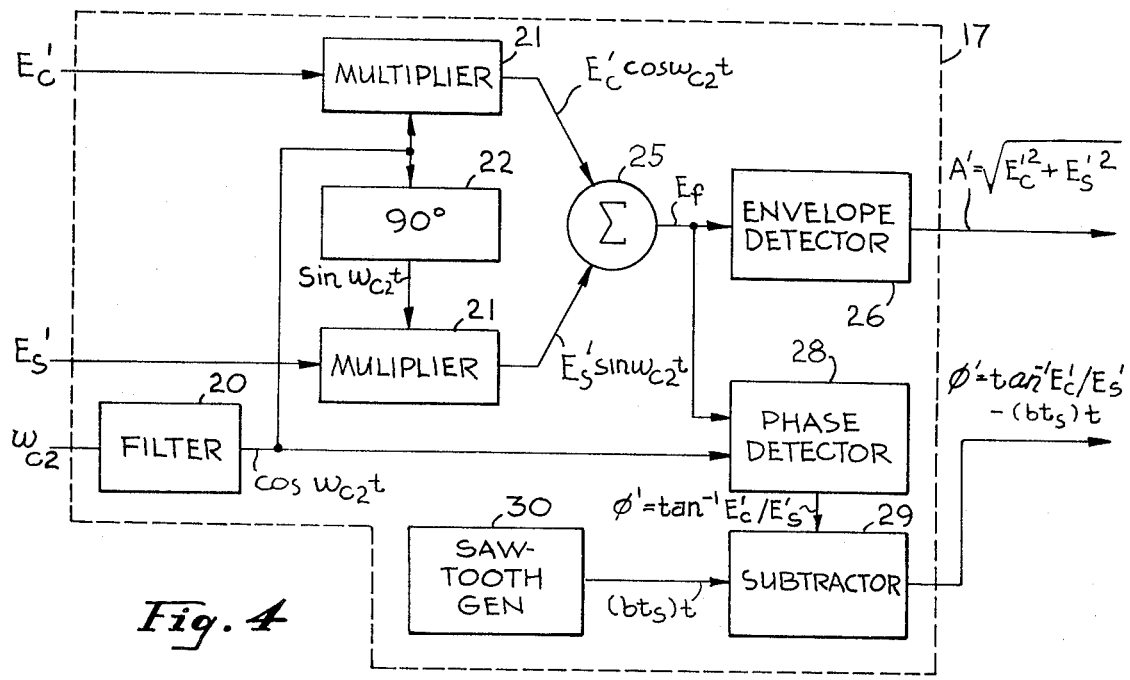
FIG. 4 is an electrical block diagram illustrating details of the function generator 17 in FIG. 1.

The above operations of equations (13) and (14) are provided in the embodiment of FIG. 1 by feeding the signals $E_c'$ and $E_s'$ to an appropriate function generator 17 along with the output of the fixed rate clock 6. Details of the function generator 17 are shown in FIG. 4 and will be considered later on herein. It will be understood that, not only are the time-varying signals $E_c'$ and $E_s'$ representing the real and imaginary components of the frequency spectrum much more simply derivable than would be signals conforming to the frequency-varying terms $E_c$ and $E_s$, but also, the operations required by Equations (13) and (14) using the signals $E_c'$ and $E_s'$ can be performed by a much simpler function generator as compared to the complexity which would be involved in performing the operations required by Equations (3) and (4) using signals conforming to the frequency-varying terms $E_c$ and $E_s$.

The signals $A'$ and $\phi'$ provided by the function generator 17 are used to generate displays of the desired amplitude spectrum and phase spectrum by application thereof to respective display means, such as illustrated by cathode ray tube oscilloscopes 18 in FIG. 1, the signals $A'$ and $\phi'$ each being applied to the vertical input of a respective oscilloscope. It will be understood that a single dual trace oscilloscope may be used instead of the two oscilloscopes 18. An oscillograph may also be used where compatible with the speed of response required. The resulting displays will be continuous with the horizontal direction corresponding to frequency and with the horizontal width being appropriately chosen to accommodate the spectra on the oscilloscope screens, each spectrum having a period equal to the period of fundamental frequency of the frequencies $w_l$ to $w_n$ used for the cosine and sine terms of signals $E_c'$ and $E_s'$. Since the horizontal traces of the oscilloscopes 18 can readily be adjusted to accommodate the amplitude and phase spectra for any fundamental frequency which may be used (within the adjustment range of the oscilloscopes), it will be understood that a wide choice is available for the fundamental frequency, as pointed out previously herein. The frequency calibration in the horizontal direction is such that the start of the horizontal trace corresponds to zero frequency and extends in the horizontal direction to a maximum frequency of W at the end of the half period ($\pi$ radians) of the fundamental frequency, W being the highest frequency content of the input waveform, as defined previously.

It will be understood from the description so far that, if a steady-state display of the amplitude and phase spectra of a single input pulse is desired, such a display may be obtained by causing the pulse train generator 7 in FIG. 1 to run continuously after activation by the sampling commutator 3, and by triggering the oscilloscopes 18 at the fundamental frequency of the cosine and sine terms of signals $E_c'$ and $E_s'$ at times corresponding to $t = 0$ thereof. Such a trigger signal may be derived, for example, from the pulse train generator 7 in response to the leading edge of any of the first pulses produced thereby.

If a real-time spectrum analysis is desired on each of a plurality of pulses provided by the input signal $e(t)$, then the pulse train generator 7 is caused to generate pulses for only a single period of the fundamental frequency in response to each cycling by the sampling commutator 3, which in turn cycles the sample-and-hold circuits 5 once for each pulse of the input signal $e(t)$. The trigger signal for the oscilloscopes may again be derived from the leading edge of any of the first pulses produced by the pulse train generator 7 in FIG. 1. Also, the fundamental frequency of $w_l$ to $w_n$ is chosen to provide a short enough analysis time so that the transient displays of each pulse are completed before the next occurring pulse of the input signal. The resulting transient amplitude and phase spectra appearing on the oscilloscopes 18 may be permanently recorded, for example, using a high speed camera. Other means for recording may, of course, also be employed, such as generally illustrated in FIG. 1 by a recorder 19.

Figure 3:
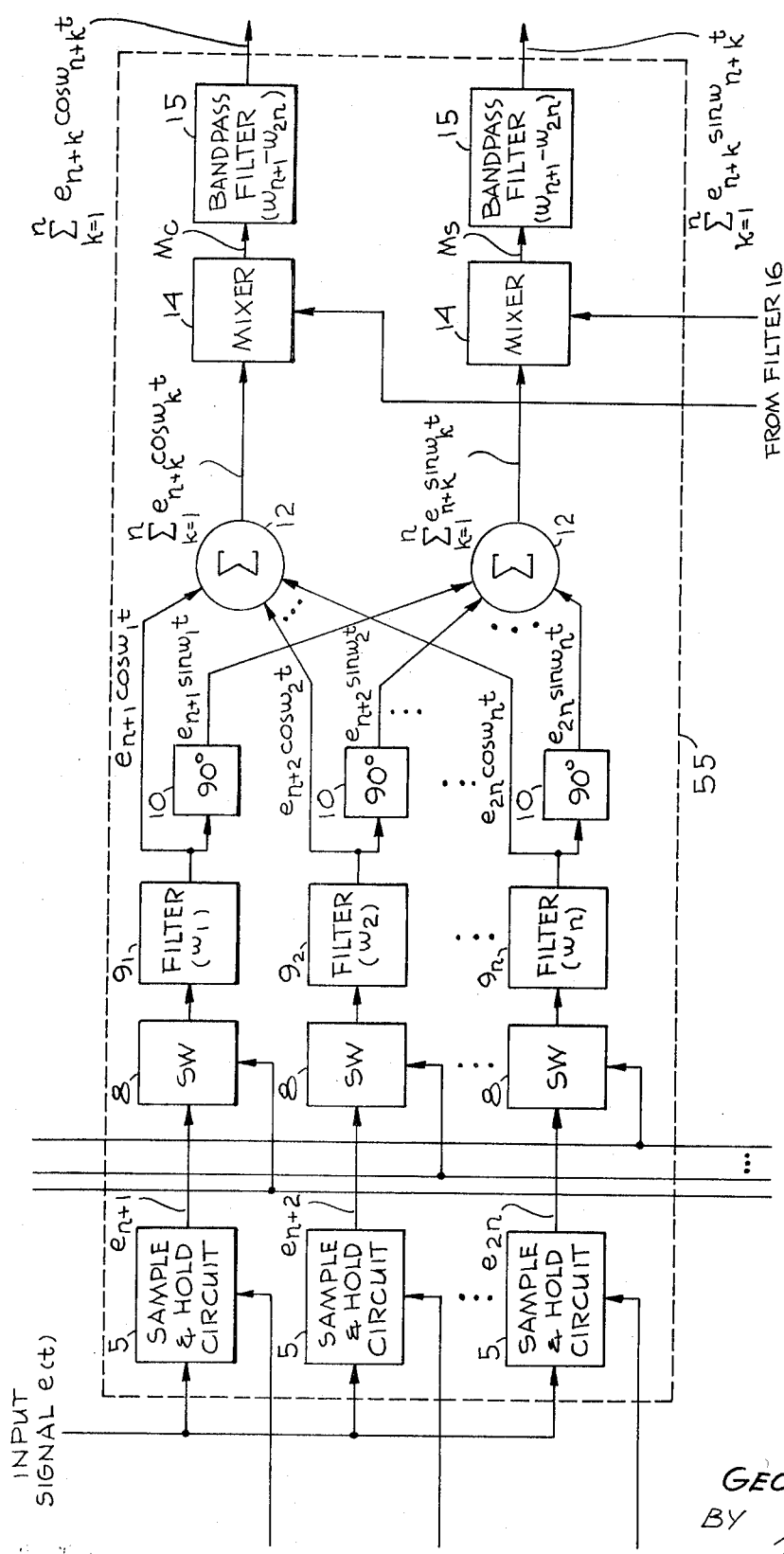
FIG. 3 is an electrical block diagram illustrating details of the add-on unit 55 in FIG. 1.

Reference is now directed to FIG. 3 for a description of typical circuitry which may be employed for the add-on unit 55 generally illustrated in FIG. 1. It will be seen from FIG. 3 that the add-on unit 55, similar to the basic unit 50 in FIG. 1, includes n number of sample-and-hold circuits 5 for providing the samples $e_{n+1}$ to $e_{2n}$ along with respective switches 8, narrowband filters $9_l$ to $9_n$, 90° phase shifters 10, and two summing amplifiers 12 for deriving the cosine and sine sums $$\sum_{k=1}^{n} e_{n+k} \cos w_k t \qquad (15)$$

and $$\sum_{k=1}^{n} e_{n+k} \sin w_k t \qquad (16)$$

pp The add-on unit 55 additionally includes two mixers 14 and two bandpass filters 15, which may be of conventional form, and to which the outputs of the summing amplifiers 12 are respectively applied for performing a frequency up-conversion so as to obtain summed cosine and sine signals $$\sum_{k=1}^{n} e_{n+k} \cos w_{n+k} t \qquad (17)$$

and $$\sum_{k=1}^{n} e_{n+k} \sin w_{n+k} t \qquad (18)$$

having the proper frequencies for summation in the summing amplifiers 13 in FIG. 1 along with the cosine and sine summations from the basic unit 50.

The mixers 14 in FIG. 3 each receive a signal $\cos w_n t$ from a filter 16 provided in the embodiment of FIG. 1 for mixing with the outputs from the add-on unit summing amplifiers 12 to provide mixer output signals $M_c$ and $M_s$ which may be expressed as:

$$M_c = \tfrac{1}{2} \sum_{k=1}^{n} e_{n+k} (\cos w_{n+k} t + \cos w_{n-k} t) \qquad (19)$$

and $$M_s = \frac{1}{2}\sum_{k=1}^{n} e_{n+k}(\cos w_{n+k}t + \cos w_{n-k}t) \qquad (20)$$

The bandpass filters 15 are designed to pass only frequencies within the band $w_{n+l}$ and to provide a gain of two to compensate for a loss of amplitude in the mixing operations, as indicated by the "1/2" factor in the mixer Equations (19) and (20). Accordingly, the outputs from the filters 15 of the add-on unit of FIG. 3 will be the desired cosine and sine summation signals of Equations (17) and (18). It will be understood that other add-on units may be constructed in an analogous manner to that shown in FIG. 3, with suitable mixing signals being provided, such as illustrated in FIG. 1 by the provision of filter 16 for use with the add-on unit 55.

Attention is next directed to FIG. 4, which illustrates details of an exemplary function generator which may be employed for the spectrum function generator 17 generally illustrated in FIG. 1. As illustrated in FIG. 4, the pulse output at frequency $w_{c2}$ from the fixed rate clock 6 in FIG. 1 is applied to a filter 20 for producing the sinusoidal signal $\cos w_{c2}t$ which, in turn, is applied to a 90° phase shifter 22 for producing the quadrature sinusoidal signal $\sin w_{c2}t$. These signals $\cos w_{c2}t$ and $\sin w_{c2}t$ are applied to respective multipliers 20 along with respective ones of the signals $E_c'$ and $E_s'$ from respective summing amplifiers 13 in FIG. 1 to provide the multiplier outputs:

$$E_c' \cos w_{c2}t$$

and $$E_s' \sin w_{c2}t$$

The outputs of the multipliers 20 are summed by a summing amplifier 25 to provide a resultant signal $E_f$ expressable as:

$$E_f = E_c' \cos w_{c2}t + E_s' \sin w_{c2}t$$

and which may be rewritten as:

$$E_f = \sqrt{E_c'^2 + E_s'^2}\,[\cos w_{c2}t + \tan^{-1} E_s'/E_c']\cdot$$

It will thus be understood that the envelope of the signal $E_f$ at the output of the summing amplifier 25 in FIG. 4 is the quantity $\sqrt{E'_c{}^2 + E'_s{}^2}$, and that the phase difference between the signal $E_f$ and the signal $\cos w_{c2}t$ from the filter 20 is $\tan^{-1} E_s'/E_c'$.

Accordingly, as illustrated in FIG. 4, by feeding the output signal $E_f$ from the summing amplifier 25 to an envelope detector 26 and to a phase detector 28 (both of which may be of conventional form) along with the signal $\cos w_{c2}t$ from the filter 20, the signals $A'$ and $\phi'_o$ are obtained. For a choice of the fundamental frequency such that $w_l = w_o$ so that $b = 0$, then $\phi'_o = \phi'$, in which case the output of the phase detector 28 can be directly used for $\phi'$. However, if a fundamental frequency is chosen so that b is not zero, the term $(bt_s)t$ must be subtracted from $\phi'_o$. This may typically be accomplished, as illustrated in FIG. 4, by feeding the output signal $\phi'_o$ from the phase detector 28 to a subtractor 29 for the purpose of having the term $(bt_s)t$ provided by a sawtooth generator 30 subtracted therefrom to produce the resulting desired output signal $\phi'$. The subtractor 29 and the sawtooth generator 30 may be of conventional form, the latter being adjustable in accordance with the chosen values for $b$ and $t_s$.

Figure 5:
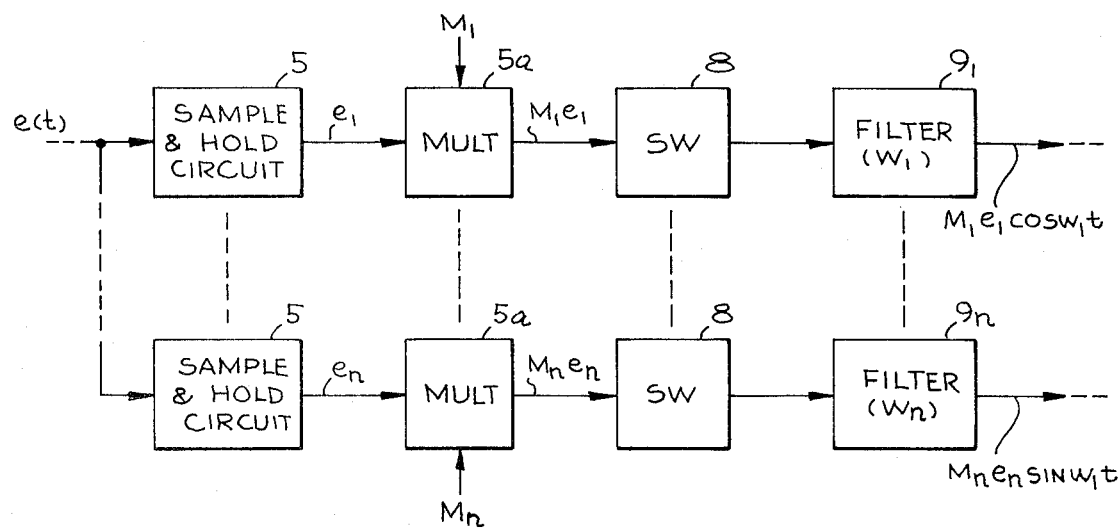
FIG. 5 is an electrical block diagram illustrating how a weighting capability may be provided for the apparatus of FIG. 1.

Referring now to FIG. 5, illustrated therein is a typical manner in which the Fourier transform circuitry of FIG. 1 may readily be modified to permit a window-weighing capability to be provided. As will be apparent from FIG. 5, the modification merely involves the addition of a multiplier 5a for each frequency channel responsive to a respective multiplier factor $M_1 - M_n$ and through which the output of the respective sample-and-hold circuit is fed for introducing a desired weighting with respect thereto. The outputs $E_c'$ and $E_s'$ of the summing amplifiers 12 in FIG. 1, which are electrical representations of the real and imaginary components of the Fourier transform, may then be represented as $$E_c' = \sum_{k=1}^{n} M_k e_k \cos w_k t$$

and $$E_s' = \sum_{k=1}^{n} M_k e_k \sin w_k t$$

Figure 6:
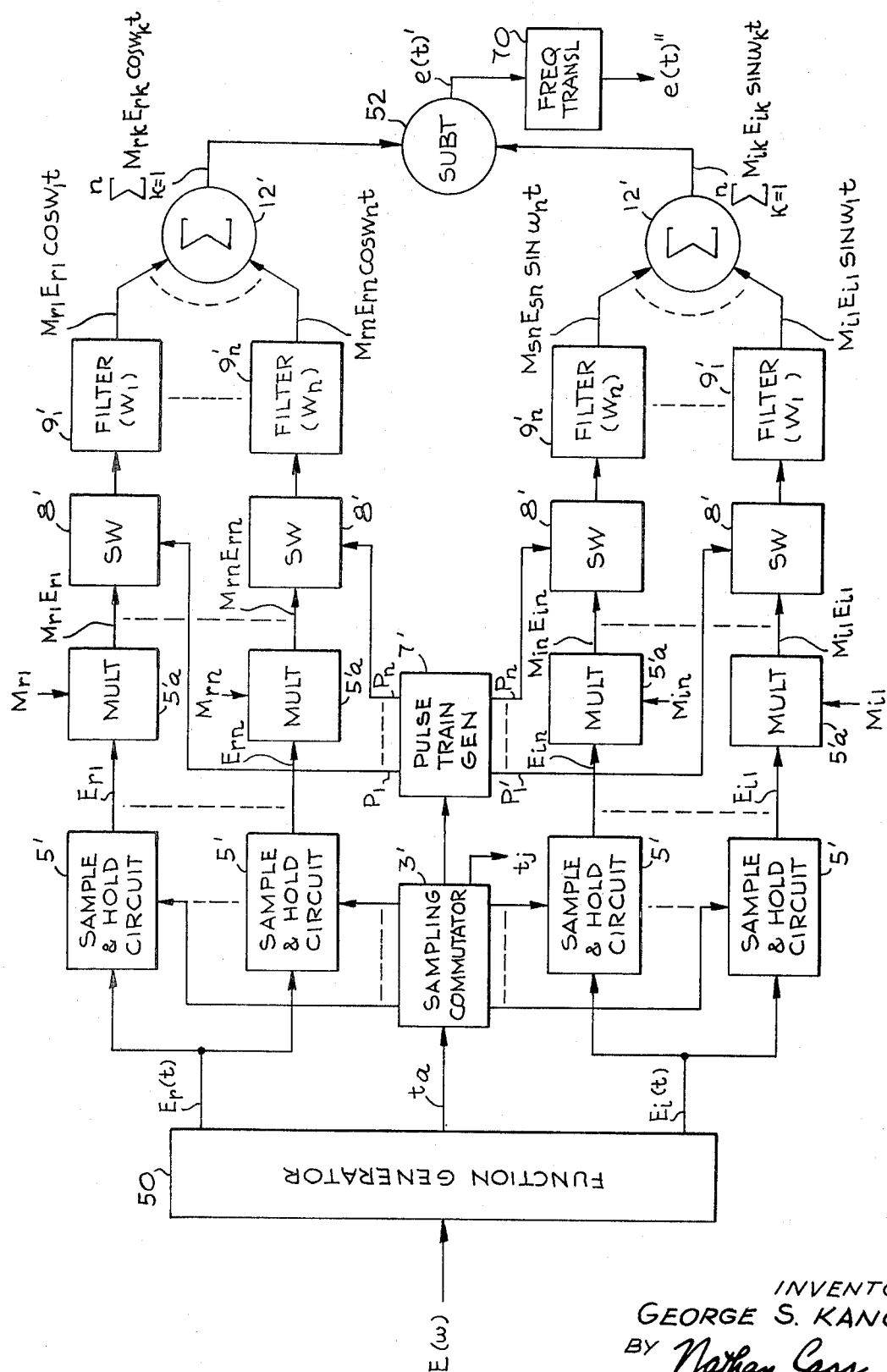
FIG. 6 is an electrical block diagram of apparatus for deriving a weighted or unweighted electrical representation of the inverse Fourier transform.

Having described how a weighted or unweighted continuous electrical representation of the Fourier transform of an input signal may typically be derived and displayed in essentially real time in accordance with the invention, next to be considered is the manner in which the weighted or unweighted inverse Fourier transform may be performed in accordance with the invention using a basically similar approach, as typically illustrated in FIG. 6. The reasons for this similarity will become evident as the description progresses. For case of comparison between FIG. 6 and FIGS. 1 and 5, those elements in FIG. 6 which may have similar structures and functions as those in FIGS. 1 and 5 are designed by primed numerical designations having the same values as their corresponding elements in FIGS. 1 and 5.

Figure 7:
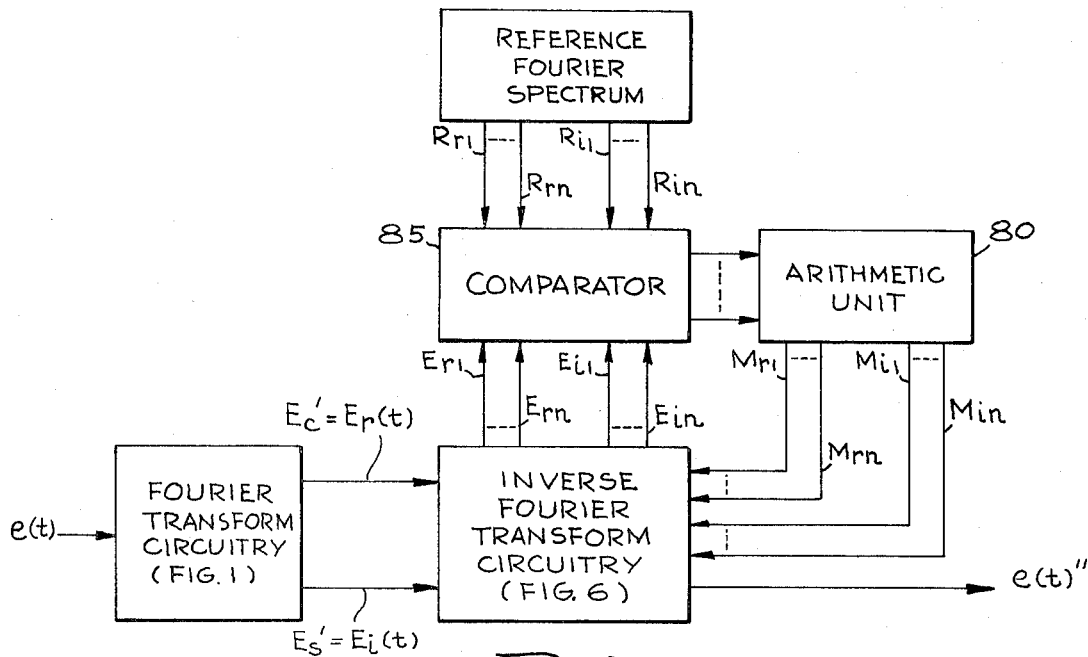
FIG. 7 is an electrical block diagram illustrating how the apparatus of FIGS. 1 and 6 may be utilized in a larger system.

It will be seen from FIG. 7 that the input signal $E(w)$ on which the inverse Fourier transform is to be performed is first applied to a function generator 50, which may be of conventional form, for generating time-simulated output signals $E_r(t)$ and $E_i(t)$ respectively corresponding to the real and imaginary components of the input signal $E(w)$ with the frequency variable $w$ being simulated by the time variable $t$. Often, such signals may have already been made available for other purposes in a signal analysis system, so as to thereby obviate having to specially generate them for the inverse Fourier transform approach being considered here. For example, such signals may be available because the analysis system provides for spectrum analysis using the Fourier transform derivation approach of the invention described previously.

As will be seen from FIG. 6 these time-simulated real and imaginary signal components $E_r(t)$ and $E_i(t)$ of the input signal $E(w)$ are each separately sampled at a Nyquist rate using a sampling commutator 3', which may be of the same general form as the sampling commutator 3 in FIG. 1, except that it provides for the separate sampling of each of the input signal real and imaginary components $E_r(t)$ and $E_i(t)$ and the storing of the resulting samples in appropriate ones of the respective sets of sample-and-hold circuits 5' provided therefor. The operation of the sampling commutator 3' may, for example, be initiated by a signal $t_a$ provided by the function generator 50, or else the signal $t_a$ may be derived from some other source, such as a threshold circuit similar to the threshold circuit 2 in FIG. 1.

At this point in the description of the inverse Fourier transform approach of the invention, it will be useful to temporarily depart from the description of FIG. 6 in order to present the mathematical relationships which justify using the values stored in the sample-and-hold circuits 5' for generating a continuous electrical representation of the inverse Fourier transform in essentially real time in a basically similar manner to that used for the Fourier transform.

The well known mathematical expression for the inverse Fourier transform $e(t)'$ of an input signal $E(w)$ is as follows:

$$e(t)' = \frac{1}{2\pi} \int_{-\infty}^{\infty} E(w) EXP[jwt] dw$$

By expending $EXP[jwt]$ in the above expression into its cosine and sine functions, and by also expanding $E(w)$ into its real and imaginary components $E_r(w)$ and $E_i(w)$ while restricting the integration interval to that required for the highest frequency $W$ of interest for $e(t)'$, the above inverse Fourier transform expression may then be expressed as follows:

$$e(t)' = \frac{1}{\pi} \int_0^{2\pi W} [E_r(w) \cos wt - E_i(w) \sin wt] dw \quad (21)$$

In accordance with the invention, it has been found that the above Equation (21) for the inverse Fourier transform may advantageously be implemented in a manner which permits the real and imaginary components $E_r(w)$ and $E_i(w)$ of the input waveform $E(w)$ to be provided using the samples stored in the sample-and-hold circuits 5' in FIG. 6 which, as previously described, are obtained by a Nyquist sampling of the time-simulated real and imaginary signals $E_r(t)$ and $E_i(t)$. Accordingly, Equation (21) may be converted to the following form for use in performing the inverse Fourier transform in accordance with the invention:

$$e(t)' = t_s' \left\{ \sum_{k=1}^{N'} E_{rk} \cos (kt_sw) - \sum_{k=1}^{N'} E_{ik} \sin (kt_sw) \right\} \quad (22)$$

where $E_{rk}$ is the $k$th sampled value of the time-simulated real component signal $E_r(t)$, $E_{ik}$ is the $k$th sampled value of the time-simulated imaginary component signal $e_i(t)$, $N'$ is the number of samples, and $t_s'(= \Delta W/\pi)$ is the sampling interval employed between samples taken on each of $E_r(t)$ and $E_i(t)$. The primed symbol $N'$ and $t_s'$ are used in Equation (22) to distinguish from the unprimed symbols $N$ and $t_s$ used in Equation (2) in connection with the Fourier transform.

The number of samples $N'$ used in implementing the above Equation (22) should, of course, be sufficient to obtain a resulting inverse transform signal $e(t)'$ which accurately represents the desired inverse Fourier transform of the input signal $E(w)$. Accordingly, $N'$ may be chosen sufficient to satisfy the Nyquist criteria based on the frequency contents of $E_r(t)$ and $E_i(t)$. $N'$ may also be chosen based on an examination of $e(t)'$ to make sure that $N'$ is at least large enough so that the envelope of the resulting inverse Fourier transform signal $e(t)'$ decays to essentially zero magnitude between successive periods.

Returning now to the inverse Fourier transform circuitry illustrated in FIG. 6, it will now be evident from Equation (22) and the previous discussion that the samples in the respective sample-and-hold circuits 5' may advantageously be employed in cooperation with multipliers 5a', pulse train generator 7', switches 8', filters $9_1'$ to $9_n'$ and summing amplifiers 12' to synthesize the harmonically related cosine and sine functions of appropriate peak amplitudes required by the inverse Fourier transform in the same basic way as previously described in connection with FIGS. 1 and 5 for the Fourier transform. However, since the peak amplitudes of the cosine and sine functions of the inverse Fourier transform are not the same as they are for the Fourier transform, the inverse Fourier transform circuitry of FIG. 6 differs from FIG. 1 in that it provides for the separate synthesizing of both the sine and cosine functions, rather than using the FIG. 1 approach in which the sine functions are obtained by a 90° phase-shifting of the cosine functions. Accordingly, the pulse train generator 7' of FIG. 6 will differ from the pulse train generator 7 of FIG. 1, since it will additionally have to provide for the separate synthesizing of the sine functions by the provision of the additional signals $P_1'$ to $P_n'$ having 90° phase shifts relative to respective ones of the signals $P_1$ to $P_9$.

It will thus be apparent from FIG. 6 that the respective output signals from the summing amplifiers 12' will constitute weighted or unweighted continuous electrical representations in essentially real time of the components making up Equation (22), and may accordingly be applied to a subtracting amplifier 52 for providing a resulting electrical representation of the desired inverse Fourier transform $e(t)'$. As can be done for the Fourier transform, the fundamental frequency $w_1$ of the synthesized harmonically related cosine and sine functions used for the inverse Fourier transform may also be chosen to have any desired value, depending on the use intended for the resulting inverse Fourier transform signal $e(t)'$. Also, the signal $e(t)'$ may be applied to a conventional frequency translator 70 to provide a like signal $e(t)''$ except shifted to a desired frequency band.

Having described how weighted and unweighted electrical representations of the Fourier and inverse Fourier transform may be provided in accordance with the invention, reference is next directed to FIG. 7 which illustrates how both may be utilized in a larger system involving the derivation and modification of the frequency spectrum of an input waveform $e(t)$ in accordance with desired criteria.

As will be seen from FIG. 7, an input signal $e(t)$ whose frequency spectrum is to be modified is applied to the Fourier transform circuitry of FIG. 1 for producing output signals $E_c'$ and $E_s'$ respectively corresponding to the real and imaginary components of the Fourier transform of $e(t)$, which are thus representative of the frequency and phase spectra of $e(t)$, as will be evident from the previous description in connection with FIG. 1. It will, of course, be understood that these signals $E_c'$ and $E_s'$ indicated in FIG. 7 are those appearing at the outputs of the summing amplifiers 12 in FIG. 1. In accordance with the embodiment of the invention illustrated in FIG. 7, these signals $E_c'$ and $E_s'$ obtained from the Fourier transform circuitry of FIG. 1 are advantageously used as the time-simulated real and imaginary components $E_r(t)$ and $E_i(t)$ required for application to the inverse Fourier transform circuitry illustrated in FIG. 6. As will shortly become apparent, the inverse Fourier transform circuitry of FIG. 6 is employed in the embodiment of FIG. 7 for modifying the frequency spectrum (and/or phase spectrum) of $e(t)$ represented by $E_c'$ and $E_s'$ in accordance with desired criteria, and then generating an electrical output signal $e(t)'$ representative of the modified input waveform. For example, the embodiment of FIG. 7 could be used for the purpose of line equalization. In such an application, $e(t)$ moved to an impulse response of a line, and $e(t)'$ would be the impulse response of the equalizer. The equalization requirement would then be that the amplitude spectrum of the product of $e(t)$ and $e(t)'$ be flat within the frequency band of interest, and that the phase spectrum of the product of $e(t)$ and $e(t)'$ be a linear function of frequency. The reference DC values in FIG. 7 would then be sampled values of the Fourier spectrum of an ideal line impulse response, and $E_r(t)$ and $E_i(t)$ would respectively be the real and imaginary parts of the frequency response of the actual line, where the frequency variable is simulated by the time variable $t$. The output $e(t)'$ would then be an impulse response of the equalizer, which may be sampled to set the tap gains of a transversal filter in order to provide the desired equalization.

Accordingly, referring to FIG. 6 along with FIG. 7, it will be seen that the samplings $E_{rl}$ to $E_{rn}$ and $E_{il}$ to $E_{in}$ obtained from the outputs of the sample-and-hold circuits 5' in FIG. 6 are applied to a comparator 85 in FIG. 7 for comparison with respective corresponding reference DC values $R_{rl}$ to $R_{rn}$ and $R_{il}$ to $R_{in}$ which, for example, might represent a reference Fourier spectrum. The comparator 85 may be of conventional form for providing this comparison in accordance with any desired criteria that one might wish to provide. The outputs from the comparator 85 are applied to an arithmetic unit 80 which operates in response thereto to provide values for the weighting factors $M_{rl}$ to $M_{rn}$ and $M_{il}$ to $M_{in}$ applied to the multipliers 5a' of the inverse Fourier transform circuitry of FIG. 6, whereby to provide the desired form for the resulting output signal $e(t)'$ in accordance with the results of the comparison. For example, if the criteria provided for comparison by the comparator 85 is equality between each of the respective values of the sample-and-hold circuit outputs $E_{rl}$ to $E_{rn}$ and $E_{il}$ to $E_{in}$ and the reference DC values $R_{rl}$ to $R_{rn}$ and $R_{il}$ to $R_{in}$, then the arithmetic unit 80 will operate to provide weighting factors $M_{rl}$ to $M_{rn}$ and $M_{il}$ to $M_{in}$ which will cause the circuitry of FIG. 6 to produce a resulting output signal $e(t)'$ satisfying these equalities. It will be appreciated that the capability of being able to perform the desired comparison using the sample-and-hold circuit outputs and the DC reference values, rather than having to compare complex waveforms, is of very considerable advantage with regard to simplicity, economy and efficiency. Of course, if the desired modifications are known in advance, the comparison operation indicated in FIG. 7 could be omitted and the arithmetic unit 80 pre-set to provide weighting factors which will produce the desired form for the resultant output signal $e(t)'$.

As a final point with respect to the system of FIG. 7, it will be appreciated that the particular frequency band of the resulting output signal $e(t)''$ will be dependent upon the harmonically related frequencies $w_1$ to $w_n$ chosen to be synthesized by the inverse Fourier transform circuitry of FIG. 6 and the frequency translation provided by the frequency translator 70. These could, of course, be chosen so that the frequency band of $e(t)''$ is the same as that of the original input signal $e(t)$.

Although the description herein has been primarily concerned with particular exemplary embodiments of the invention, it is to be understood that the invention is not limited thereto, and that a wide variety of modifications and variations in construction, arrangement, method of operation and/or usage may be made without departing from the scope of the invention. For example, it will be apparent to those skilled in the art from the description provided herein that desired weightings of the Fourier and inverse Fourier transforms may be provided at various other points and in various other ways different from that shown in the described embodiments. The present invention is thus properly to be considered as including all possible means and methods for carrying out the invention coming within the scope of the appended claims.

The embodiments of the invention in which an exclusive property or privilege is claimed are defined as follows:

1. In apparatus for deriving an electrical signal representative of a Fourier-type mathematical transformation of an input signal, the combination of:
   sampling means including a plurality of sample-and-hold circuits for providing amplitude sampling of said input signal and for simultaneously storing the resulting amplitude samples of said input signal in respective ones of said sample-and-hold circuits,
   generating means responsive to the samples stored in said sample-and-hold circuits for simultaneously generating harmonically related time-varying cosine and sine signals having peak values proportional to respective ones of said samples, and
   means for simultaneously combining respective ones of said cosine and sine signals to produce resultant electrical signals representative of the desired Fourier-type mathematical transformation.

2. The invention in accordance with claim 1,
   wherein said desired Fourier-type transform is the Fourier transform of the input signal, and
   wherein said sampling means operates to sample said input signal at least at a Nyquist sampling rate to provide amplitude samples thereof which are stored in respective ones of said sample-and-hold circuits.

3. The invention in accordance with claim 2 wherein said time-varying harmonically related cosine and sine signals are expressable as $e_1 \cos w_1 t$, $e_2 \cos w_2 t$, ... $e_n \cos w_n t$ and $e_1 \sin w_1 t$, $e_2 \sin w_2 t$ ... $e_n \cos w_n t$, where $e_1, e_2, \ldots e_n$ correspond to said samples, $n$ is the number of samples, $t$ is the time variable, and $w$ is frequency in radians per second, and wherein the frequencies $w_1$ to $w_n$ and the fundamental frequency $w_o$ thereof satisfy the relationships $w_1 = (b=1)w_o$, $w_2 = (b+2)w_o$, ... $w_n = (b+n)w_o$, where $b$ is an integer and includes zero.

4. The invention in accordance with claim 3, wherein said input signal comprises a plurality of pulses, and wherein the fundamental frequency $w_o$ is chosen to provide an analysis time less than the time between pulses.

5. The invention in accordance with claim 3 wherein the fundamental frequency $w_o$ of said cosine and sine signals may be chosen independently of the frequency content of said input signal.

6. The invention in accordance with claim 1, wherein said desired Fourier-type transform is the inverse Fourier transform of the input signal, wherein said input signal is provided in the form of two time-simulated signals corresponding to its real and imaginary components, wherein a separate set of sample-and-hold circuits is provided for the amplitude samples of each of said time-simulated signals, wherein said sampling means operates to sample each of said time-simulated signals at least at a Nyquist sampling rate to provide amplitude samples thereof which are stored in respective ones of the respective sets of sample-and-hold circuits, and wherein said generating means responds to said amplitude samples in a manner so that the harmonically related time-varying cosine signals have peak values proportional to respective ones of the amplitude samples obtained from the time-simulated signal corresponding to the real component of the input signal and so that the harmonically related time-varying sine signals have peak values proportional to respective ones of the amplitude samples obtained from the time-simulated signal corresponding to the imaginary component of the input signal.

7. The invention in accordance with claim 6 wherein said time-varying harmonically related cosine and sine signals are expressable as $e_1 \cos w_1 t$, $e_2 \cos w_2 t$, ... $e_n \cos w_n t$ and $e_1 \sin w_1 t$, $e_2 \sin w_2 t$ ... $e_n \cos w_n t$, where $e_1, e_2, \ldots e_n$ correspond to said samples, $n$ is the number of samples, $t$ is the time variable, and $w$ is frequency in radians per second, and wherein the frequencies $w_1$ to $w_n$ and the fundamental frequency $w_o$ thereof satisfy the relationships $w_1 = (b+1)w_o$, $w_2 = (b+2)w_o$, ... $w_n = (b+n)w_o$, where $b$ is an integer and includes zero.

8. The invention in accordance with claim 7 wherein the fundamental frequency $w_o$ of said cosine and sine signals may be chosen independently of the frequency content of said input signal.

9. In apparatus for performing Fourier-type mathematical manipulations of electrical signals in essentially real-time, the combination of:
means for deriving time-simulated electrical signals representative of the real and imaginary components of the Fourier transform of an input signal,
means for providing separate Nyquist sampling of each of the real and imaginary component signals and for simultaneously providing fixed amplitude samples thereof,
means for modifying said amplitude samples in accordance with desired criteria, and
generating means responsive to the modified samples for performing an inverse Fourier transformation to produce essentially real-time resultant electrical signals representative of the real and imaginary components of said input signal but containing the modifications introduced by said means for modifying.

10. The invention in accordance with claim 9 wherein said generating means includes:
means for simultaneously generating time-varying harmonically related cosine and sine signals having peak values proportional to respective ones of said modified samples, and
means for simultaneously summing respective ones of said cosine and sine signals to produce said resultant electrical signals.

11. In apparatus for performing Fourier-type mathematical manipulations on electrical signals, the combination of:
first sampling means including a first plurality of sample-and-hold circuits for sampling an input signal and for storing amplitude samples representative thereof in respective ones of said first plurality of sample-and-hold circuits,
first generating means responsive to said sampling means for generating a first series of harmonically related time-varying cosine and sine signals having peak values proportional to respective ones of said samples,
first combining means for respectively summing and first series of cosine and sine signals to produce time-simulated electrical signals representative of the real and imaginary components of the Fourier transform of said input signal,
second sampling means including second and third pluralities of sample-and-hold circuits for separately sampling each of the real and imaginary component signals and for storing amplitude samples representative thereof in respective ones of said second and third pluralities of sample-and-hold circuits,
means for modifying the samples stored in said second and third pluralities of sample-and-hold circuits in accordance with desired criteria,
second generating means responsive to the modified samples for generating a second series of harmonically related time-varying cosine and sine signals having peak values proportional to respective ones of the modified samples derived from said real component signal, and
second combining means for respectively summing the second series of cosine and sine signals.

12. The invention in accordance with claim 11, wherein said means for modifying includes means for comparing the samples stored in said second and third pluralities of sample-and-hold circuits with predetermined reference values and for modifying sand samples in response to the results of the comparison.

13. The invention in accordance with claim 11, wherein said apparatus includes third combining means for combining the respectively summed second series of cosine and sine signals to produce an electrical signal representative of said input signal but containing the modifications introduced by said means for modifying.

14. In apparatus for analyzing a waveform, means for simultaneously providing amplitude samples of said waveform at intervals of $t_s \leq 1/2W$, where $t_s$ is the interval between samples and $W$ is the highest frequency content of said waveform, means for simultaneously producing time-varying harmonically related cosine and sine signals having peak values respectively proportional to said samples and having a fundamental frequency which is independent of the frequency content of said waveform, and means for simultaneously combining respective ones of said cosine and sine signals to produce a time-varying spectrum signal having a time variable simulating the frequency variable of the spectrum of said waveform and having a period equal to the fundamental frequency of said time-varying harmonically related cosine and sine signals.

15. The invention in accordance with claim 14, wherein said time-varying harmonically related cosine and sine signals are expressable as $e_1\cos w_1 t, e_2\cos w_2 t, \ldots e_n\cos w_n t$ and $e_1\sin w_1 t, e_2\sin w_2 t \ldots e_n\cos w_n t$, where $e_1, e_2, \ldots e_n$ correspond to said samples, $n$ is the number of samples, $t$ is the time variable, and $w$ is frequency in radians per second, and wherein the frequencies $w_1$ to $w_n$ and the fundamental frequency $w_o$ thereof satisfy the relationships $w_1 = (b+1)w_o, w_2 = (b+2)w_o, \ldots w_n = (b+n)w_o$, where $b$ is an integer and includes zero.

16. The invention in accordance with claim 14, wherein said spectrum signal corresponds to the amplitude spectrum of said waveform and is expressable as $$A' = \sqrt{E'^2_c + E'^2_s}$$

where $$E'_c = \sum_{k=1}^{n} e_k \cos w_k t$$

and $$E'_s = \sum_{k=1}^{n} e_k \sin w_k t$$

17. The invention in accordance with claim 15, wherein said spectrum signal corresponds to the phase spectrum of said waveform and is expressable as $$\phi' = \tan^{-1} E'_s / E'_c$$

where $$E'_c = \sum_{k=1}^{n} e_k \cos w_k t$$

and $$E'_s = \sum_{k=1}^{n} e_k \sin w_k t$$

18. The invention in accordance with claim 15, wherein said means for combining said cosine and sine signals produces a time-varying amplitude spectrum signal $A'$ and a time-varying phase spectrum signal $\phi'$ expressable as $$A' = \sqrt{E_c'^2 + E_s'^2}$$

and $$\phi' = \tan^{-1} E_s'/E_c' - (\bar{b}t_s)t$$

where $$E_c = \sum_{k=1}^{n} e_k \cos w_k t$$

and $$E_s = \sum_{k=1}^{n} e_k \sin w_k t$$

19. The invention in accordance with claim 28, wherein said apparatus additionally includes output means to which said spectrum signal is applied for providing a manifestation of said waveform.

20. The invention in accordance with claim 19 wherein said output means includes cathode ray tube means for producing a display of at least one of the amplitude and phase spectra of said input waveform.

21. The invention in accordance with claim 14 wherein said waveform comprises a plurality of pulses, and wherein said fundamental frequency is chosen to provide an analysis time less than the time between said pulses.

22. The invention in accordance with claim 14, wherein said means for producing time-varying harmonically related cosine and sine signals includes means for producing a first group of time-varying harmonically related cosine and sine signals having peak values respectively corresponding to a first plurality of said samples, means for producing a second group of time-varying harmonically related cosine and sine signals of like frequencies of those of said first group and having amplitudes corresponding to a second plurality of samples, and means for converting the frequencies of the second group of cosine and sine signals to frequencies which continue the harmonic relation of the first group.

23. The invention in accordance with claim 18, wherein said means for combining includes:
means for producing time-varying cosine and sine signals of like frequency,
means for multiplying the signal $E_c'$ by one of the cosine and sine signals of like frequency and for multiplying the signal $E_s'$ by the other,
means for summing the thus multiplied signals, and
envelope detector means for producing the amplitude spectrum signal $A'$ from the summed multiplied signals.

24. The invention in accordance with claim 19, wherein said means for combining additionally includes:

phase detector means to which the summed multiplied signals are applied along with one of said cosine and sine signals of like frequency for detecting the phase difference $\phi_o'$ therebetween, and means for subtracting the term $(bt_s)t$ from $\phi_o'$ for producing the phase spectrum signal $\phi'$.

25. In apparatus for analyzing a waveform, a basic unit for providing a plurality of samples of said waveform at intervals satisfying the Nyquist sampling theorem and for producing time-varying harmonically related cosine and sine signals having peak values respectively proportional to said samples, at least one add-on unit for providing an additional plurality of samples of said waveform at Nyquist sampling intervals and for producing time-varying harmonically related cosine and sine signals having peak values respectively proportional to the additional plurality of samples and with like frequencies as those produced by said basic unit, said add-on unit also including means for up-converting the frequencies of the cosine and sine signals produced thereby to frequencies such that the cosine and sine signals of the add-on unit will continue the harmonic relation of the cosine and sine signals of the basic unit, and means for combining all of said cosine and sine signals to produce a time-varying spectrum signal of said waveform with the time variable of said spectrum signal simulating the frequency variable of the spectrum of said waveform and said spectrum signal having a period equal to the fundamental frequency of the time-varying harmonically related sine and cosine signals.

26. The invention in accordance with claim 25, wherein the cosine and sine signals produced by said basic unit are expressable as $e_1\cos w_1 t, e_2\cos w_2 t \ldots e_n\cos w_n t$ and $e_1\sin w_1 t, e_2\sin w_2 t \ldots e_n\sin w_n t$, where $e_1, e_2, \ldots e_n$ are the samples provided by said basic unit, $w_1$ to $w_n$ are the harmonically related frequencies of the cosine and sine signals, and $n$ is the number of samples provided by the basic unit, wherein the cosine and sine signals produced by said add-on unit prior to application to said means for up-converting are expressable as $e_{n+1}\cos w_1 t, e_{n+2}\cos w_2 t, \ldots e_{n+m}\cos w_n t$ and $e_{n+1}\sin w_1 t, e_{n+2}\sin w_2 t \ldots e_{n+m}\sin w_n t$, where $e_{n+1}, e_{n+2} \ldots e_{n+m}$ are the samples provided by said add-on units, $w_1$ to $w_n$ are as defined above, and $m$ is the number of samples provided by the add-on unit, wherein the cosine and sine signals provided by said add-on unit after application to said means for up-converting are expressable as $e_{n+1}\cos w_{n+1}t, e_{n+2}\cos w_{n+2}t \ldots e_{n+m}\cos w_{n+m}t$, and $e_{n+1}\sin w_{n+1}t, e_{n+2}\sin w_{n+2}t \ldots e_{n+m}\sin w_{n+m}t$, and wherein the frequencies $w_1$ to $w_n$ and $w_{n+1}$ to $w_{n+m}$ and the fundamental frequencies $w_o$ thereof satisfy the relationships $w_1 = (b+1)w_o$, $w_2 = (b+2)w_o \ldots w_n = (b+n)w_o$, $w_{n+1} = (b+n+1)w_o$, $w_{n+2} = (b+n+2)w_o \ldots w_{n+m} = (b+n+m)w_o$, where $b$ is an integer including zero.

27. In a method of analyzing the spectrum of a waveform in essentially real-time, the steps of:

amplitude sampling said waveform at intervals of $t_s \leq 1/2W$, where $t_s$ is the interval between samples and $W$ is the highest frequency content of said waveform, simultaneously generating time-varying harmonically related cosine and sine signals having peak values respectively proportional to said samples and expressable as $e_1\cos w_1 t, e_2\cos w_2 t \ldots e_n\cos w_n t$ and $e_1 \sin w_1 t, e_2 \sin w_2 t \ldots e_n \sin w_n t$, where $e_1, e_2 \ldots e_n$ correspond to said samples, $n$ is the number of samples, $t$ is the time variable and $w$ is frequency in radians per second, and the frequencies $w_1$ to $w_n$ and the fundamental frequency $w_o$ thereof satisfy the relationships $w_1 = (b+1)w_o$, $w_2 = (b+2)w_o \ldots w_n = (b+n)w_o$, where $b$ is an integer and includes zero, and simultaneously combining the generated cosine and sine signals to produce a time-varying spectrum signal such that the time variable of said spectrum signal simulates the frequency variable of the spectrum of said waveform and said spectrum signal has a period equal to the fundamental frequency $w_o$.

28. The invention in accordance with claim 27, wherein the step of combining produces an amplitude spectrum signal $A'$ and a phase spectrum signal $\phi'$ expressable as $$A' = \sqrt{E_c'^2 + E_s'^2}$$

and $$\phi' = \tan^{-1} E_s'/E_c' - (bt_s)t$$

where $$E_c = \sum_{k=1}^{n} e_k \cos w_k t$$

and $$E_s = \sum_{k=1}^{n} e_k \sin w_k t$$

29. The invention in accordance with claim 27, wherein the step of generating is performed by steps including generating pulse trains having harmonically related frequencies with amplitudes proportional to said samples, and filtering the resultant signals over narrow frequency bands corresponding to the respective frequencies of said pulse trains.

30. The invention in accordance with claim 27, wherein said steps of sampling and generating are performed by steps including generating a first group of time-varying harmonically related cosine and sine signals having amplitudes proportional to a first plurality of said samples, generating a second group of time-varying harmonically related cosine and sine signals of like frequencies as those of said first group and having amplitudes proportional to a second plurality of said samples, and converting the frequencies of the second group of cosine and sine signals to frequencies which continue the harmonic relation of the first group.

31. In a method of deriving an essentially real-time electrical signal representative of a desired Fourier-type mathematical transformation of an input signal, the steps of:

sampling said input signal to provide fixed value amplitude samples representative thereof, simultaneously generating harmonically related time-varying cosine and sine signals having peak values proportional to respective ones of said samples, and simultaneously combining said cosine and sine signals to produce essentially real-time resultant electrical signals representative of the desired Fourier-type mathematical transformation.

32. The invention in accordance with claim 31, wherein said desired Fourier-type mathematical transformation is the Fourier transform of the input signal, wherein said sampling is such as to sample said input waveform in a manner so that said samples are amplitude samples of said input signal taken at intervals satisfying the Nyquist sampling rate, and wherein said resultant electrical signals comprise two time-simulated electrical signals representative of the real and imaginary components of the Fourier transform of the input signal.

33. The invention in accordance with claim 31, wherein said desired Fourier-type mathematical transformation is the inverse Fourier transform of the input signal, wherein said input signal is provided in the forms of time-simulated signals corresponding to its real and imaginary components, and wherein said sampling is such as to separately sample each of said time-simulated signals in a manner so that said samples are amplitude samples thereof taken at sufficiently closely spaced intervals so that said resultant electrical signals are representative of the inverse Fourier transform.

34. The invention in accordance with claim 33, wherein said generating is such that the harmonically related time-varying cosine signals having peak values proportional to respective ones of the amplitude samples obtained from the time-simulated signal corresponding to the real component of the input signal and the harmonically related time-varying sine signals have peak values corresponding to respective ones of the amplitude samples obtained from the time-simulated signal corresponding to the imaginary component of the input signal.

35. In a method of performing Fourier-type mathematical manipulations on electrical signals, the steps of:

sampling an input signal at least at a Nyquist sampling rate to provide fixed value amplitude samples representative thereof, generating a first series of harmonically related time-varying cosine and sine signals having peak values proportional to respective ones of said samples, combining said cosine and sine signals to produce time-simulated electrical signals representative of the real and imaginary components of the Fourier transform of said input signal, sampling each of the real and imaginary component signals at least at a Nyquist sampling rate to provide fixed value amplitude samples thereof, modifying the fixed value amplitude samples obtained from sampling the real and imaginary component signals in accordance with desired criteria, generating a second series of harmonically related time-varying cosine and sine signals having peak values proportional to respective ones of the modified samples, and respectively summing the second series of cosine and sine signals.

36. The invention in accordance with claim 35, wherein said method includes the step of comparing the fixed value amplitude samples obtained from sampling the real and imaginary component signals with predetermined reference values, and wherein the step of modifying modifies the amplitude samples obtained from sampling the real and imaginary component signals in response to the results obtained during the step of comparing.

37. The invention in accordance with claim 35, wherein said method includes the step of combining the respectively summed second series of cosine and sine signals to produce a resultant electrical signal representative of said input signal but containing the modifications introduced by the step of modifying.

38. In apparatus for deriving an electrical signal representative of a Fourier-type mathematical transformation of an input signal, the combination of:

sampling means including a plurality of sample and hold circuits for sampling said input signal and for storing samples representative thereof in respective ones of said sample-and-hold circuits, generating means responsive to the samples stored in said sample-and-hold circuits for generating harmonically related time-varying cosine and sine signals having peak values proportional to respective ones of said samples, said generating means including:

means for producing a first group of time-varying harmonically related cosine and sine signals having peak values respectively corresponding to a first plurality of said samples, means for producing a second group of time-varying harmonically related cosine and sine signals of like frequencies of those of said first group and having amplitudes corresponding to a second plurality of samples, means for converting the frequencies of the second group of cosine and sine signals to frequencies which continue the harmonic relation of the first group, and means for combining said cosine and sine signals to produce resultant electrical signals representative of the desired Fourier-type mathematical transformation.

39. In apparatus for deriving an electrical signal representative of a Fourier transform of an input signal, the combination of:

sampling means including a plurality of sample-and-hold circuits for sampling said input signal at least at a Nyquist rate and for storing amplitude samples representative thereof in respective ones of said sample-and-hold circuits, generating means responsive to the samples stored in said sample-and-hold circuits for generating harmonically related time-varying cosine and sine signals having peak values proportional to respective ones of said samples, said time-varying harmonically related cosine and sine signals being expressable as $e_1 \cos w_1 t, e_2 \cos w_2 t, \ldots e_n \cos w_n t$ and $e_1 \sin w_1 t, e_2 \sin w_2 t \ldots e_n \sin w_n t$, where $e_1, e_2 \ldots e_n$ correspond to said samples, n is the number of samples, $t$ is the time variable, and $w$ is frequency in radians per second, and where the frequencies $w_1$ to $w_n$ and the fundamental frequency $w_o$ thereof satisfy the relationships $w_1 = (b+1)w_o$, $w_2 = (b+2)w_o$, ... $w_n = (b+n)w_o$, wherein $b$ is an integer and includes zero, and where the fundamental frequency $w_o$ of said cosine and sine signals may be chosen independently of the frequency content of said input signal, and means for combining said cosine and sine signals to produce resultant electrical signals representative of the desired Fourier-type mathematical transformation, said combining means operating to respectively sum said cosine and sine signals so that said resultant signals comprise two signals corresponding to the real and imaginary components of the Fourier transform of the input signal.

40. The invention in accordance with claim 39, wherein said generating means includes means for weighting the peak values of said cosine and sine signals.

41. The invention in accordance with claim 39, wherein said combining means includes means for combining said resultant signals to provide a time-varying spectrum signal representative of the amplitued spectrum of the input signal with the time variable simulating the frequency variable and having a period equal to the fundamental frequency $w_o$ of said cosine and sine signals.

42. The invention in accordance with claim 41, wherein said combining means additionally includes means for combining said resultant signals to provide a continuous time-varying spectrum signal representative of the phase spectrum of the input signal with the time variable simulating the frequency variable of the phase spectrum and having a period equal to the fundamental frequency $w_o$ of said cosine and sine signals.

43. The invention in accordance with claim 42, wherein said apparatus includes means for displaying at least one of the amplitude and phase spectra signals.

44. In apparatus for deriving an electrical signal representative of an inverse Fourier transform of an input signal provided in the form of two time-simulated signals corresponding to its real and imaginary components, the combination of:

sampling means including a plurality of sample-and-hold circuits for sampling said time-simulated signals at least at a Nyquist rate and for storing amplitude samples representative thereof in respective ones of said sample-and-hold circuits, a separate set of sample-and-hold circuits being provided for the amplitude samples of each of said time-simulated signals, generating means responsive to the samples stored in said sample-and-hold circuits for generating harmonically related time-varying cosine and sine signals having peak values proportional to respective ones of said samples, said time-varying harmonically related cosine and sine signals being expressable as $e_1\cos w_1 t$, $e_2\cos w_2 t$, ... $e_n\cos w_n t$ and $e_1\sin w_1 t$, $e_2\sin w_2 t$ ... $e_n\cos w_n t$, where $e_1, e_2, ... e_n$ correspond to said samples, $n$ is the number of samples, $t$ is the time variable, and $w$ is frequency in radians per second, and where the frequencies $w_1$ to $w_n$ and the fundamental frequency $w_o$ thereof satisfy the relationships $w_1 = (b+1)w_o$, $w_2 = (b+2)w_o$, ... $w_n = (b+n)w_o$, where $b$ is an integer and includes zero, and where the fundamental frequency $w_o$ of said cosine and sine signals may be chosen independently of the frequency content of said input signal, and means for combining said cosine and sine signals to produce resultant electrical signals representative of the desired Fourier-type mathematical transformation, said combining means operating to respectively sum said cosine and sine signals so that said resultant signals comprise two signals corresponding to the real and imaginary components of the inverse Fourier transform of the input signal.

45. The invention in accordance with claim 44, wherein said generating means includes means for weighting the peak values of said cosine and sine signals.

46. The invention in accordance with claim 45, wherein said combining means includes means for combining said resultant signals to provide a single continuous time-varying signal representative of the inverse Fourier transform of the input signal.

47. The invention in accordance with claim 46, wherein said apparatus includes means for providing a frequency tramslation of said single time-varying signal.

* * * * *